United States Patent [19]

Sarle

[11] 4,035,770
[45] July 12, 1977

[54] SWITCHING SYSTEM FOR USE WITH COMPUTER DATA LOOP TERMINALS AND METHOD OF OPERATING SAME

[76] Inventor: Susan Lillie Sarle, 24 Cherry Lane, Chatham, N.J. 07928

[21] Appl. No.: 657,039

[22] Filed: Feb. 11, 1976

[51] Int. Cl.² .............. H04Q 1/20; H04Q 1/52; G06F 3/04
[52] U.S. Cl. ................ 340/147 R; 179/15 AL; 364/900
[58] Field of Search .... 340/172.5, 147 LP, 147 SC, 340/409, 147 R; 179/15 BF, 15 AL, 175.31 R; 235/153 AE, 153 AK; 178/58 A

[56] References Cited

U.S. PATENT DOCUMENTS

| 3,458,661 | 7/1969 | Forde | 179/15 AL |
|---|---|---|---|
| 3,519,750 | 7/1970 | Beresin | 179/15 AL |
| 3,519,935 | 7/1970 | Hochgraf | 179/15 AL |
| 3,652,798 | 3/1972 | NcNeilly | 179/15 AL |
| 3,716,834 | 2/1973 | Adams | 340/147 SC |
| 3,755,789 | 8/1973 | Collins | 340/172.5 |
| 3,859,468 | 1/1975 | Smith | 179/15 AL |
| 3,876,983 | 4/1975 | Zafiropulo | 340/147 SC |
| 3,879,710 | 4/1975 | Maxemchuk | 340/172.5 |

Primary Examiner—James D. Thomas
Attorney, Agent, or Firm—Gerald J. Ferguson, Jr.; Joseph J. Baker

[57] ABSTRACT

A switching system for use with a plurality of data terminals connected in series in a loop, the ends of which are connected to a central computer so that the central computer may communicate with the data terminals, the system comprising a plurality of switching means; the loop being arranged in a plurality of subloops respectively corresponding to the plurality of data terminals where the data terminals are respectively disposed at the ends of the subloops remote from the central computer and the other ends of the subloops are disposed at a single location; the plurality of switching means being disposed at the single location and respectively associated with the plurality of subloops so that they are connected in series in the loop; each switching means including means for connecting its associated data terminal in circuit in the loop when the switching means is in a first position and means for immediately removing the last-mentioned data terminal and its associated input and output wires completely from the loop while substantially simultaneously shorting the open circuit introduced in the loop by the removal of the data terminal and its associated wire from the loop when the switching means is in its second position. Also disclosed is a method and apparatus for quickly locating faults on the loop. Further, there is disclosed apparatus for combining a plurality of the loops into a single combined loop whenever an internal fault occurs within the central computer whereby the single combined loop may be connected to a second remote or local computer and preselected ones of the data terminals on the loops may be connected into the single combined loop.

17 Claims, 3 Drawing Figures

SWITCHING SYSTEM FOR USE WITH COMPUTER DATA LOOP TERMINALS AND METHOD OF OPERATING SAME

BACKGROUND OF THE INVENTION

1. Field of the Invention

This invention relates to a switching system and in particular to such systems for use with computer data loop terminals and to methods of operating the same.

2. Discussion of the Prior Art

This invention is typically applicable to data collection systems employed in department stores or the like where a central computer or controller communicates with a number of different kinds of data terminals such as point of sale terminals, ticket units and display/printer stations. Details of such systems are described, for example in IBM 3650 Retail Store System Installation Manual — Physical Planning, GA 27-3074-1, File No. 3650-15, Copyright International Business Machines Corporation 1973, 1974. Collected data is subsequently processed in accordance with the needs of the installation. In such installations, the data terminals are connected in a number (typically three) of loops with respect to the central controller with each loop containing a plurality of terminals (typically 20 to 65) connected in series. The beginning and end of each loop are connected to the controller. It is known and typical to provide a series of subloops within each loop where each subloop may contain at least four data terminals.

Reference should be made to FIG. 1 where there is shown a single loop indicated at 100 having a plurality of subloops indicated at 102, 104 an 106. As is known but not typical, one data terminal may be associated with each subloop. The terminals are indicated at 108, 110 and 112. The beginning 114 and end 116 of loop 100 connect to a computer or controller 118. Thus one end of each subloop is associated with a data terminal while the other end is disposed at a location, which preferably is near the controller 118. Disposed at this location is a telephone type wiring terminal box indicated by dotted lines at 120. Disposed within the box are a plurality of manually removable clips 122 – 132, each loop having associated therewith two of the clips. Manually removable jumper cables 134 and 136 are also provided to complete the electrical connections between the subloops.

The sublooping arrangement is provided to facilitate more efficient usage of a loop. If a fault occurs within a data terminal, the controller will indicate fairly accurately which terminal is in need of repair. However, if the fault is, for example, located within the wiring to or from a terminal, the the controller may only indicate that a fault has occurred within the loop. Since the entire loop becomes inoperative upon the occurrence of a fault and since some loops may have as many as 65 or even more data terminals, an inoperable or down loop can become quite expensive. In particular, the data which normally would have been entered into the system through the data terminals must be preserved for later entry. Depending on the number of terminals and the activity at the terminals, it may take 20 – 40 (for example) hours to subsequently enter the data for each ½ hour the loop is down. Since this may be done on an overtime basis and since there may be a number of such occurrences, it can be appreciated how an accummulation of these occurrences would be extremely expensive.

By using the arrangement of FIG. 1, it is possible to short out the faulty subloop once it is located. Thus, if it is required to short out subloop 104, clips 126 and 128 may be removed and a jumper cable (shown in dotted lines) may be connected as shown in FIG. 1. This will have the effect of isolating loop 104 and restoring loop 100 so that data may be entered into terminals 108 and 112 while terminal 110 is either being repaired or replaced. Thus, the loop operation is rendered more efficient upon occurrence of a fault.

However, there are various shortcomings of the FIG. 1 arrangement and the other arrangements employed in the prior art. In the FIG. 1 arrangement, it is quite difficult for untrained personnel to properly remove clips and insert a shorting jumper cable with correct polarity and thereby effect removal of a terminal. Further, it should be understood that, for ease of illustration, loop 100 of FIG. 1 comprises a single wire in and out of each data terminal. However, generally, more than one such wire is employed and the number of clips and jumper cables increases directly with the number of wires added. Thus, the difficulty and resulting confusion as to proper connection and polarity thereof also directly increases whenever a multiple wire arrangement is used. Thus, quite often, valuable time is lost whenever such an untrained person attempts this procedure. Thus, it is preferable to have a technically trained person continuously available for such emergencies. However, this is usually not expedient and even when available, the FIG. 1 arrangement can still be difficult for a technician to manipulate especially when multiple wire arrangements are involved. Sometimes when a qualified technician is not on hand, the data terminal itself is unplugged from its respective jacks at a terminal location. A short circuiting plug is inserted in place of the terminal, rather than having the loop section itself shorted out. Using the short circuiting plug, however, puts two loop sections in series and lengthens the wire section between two working terminals. This can result in data loop resistance limits being exceeded resulting in possible garbled or no data input to the central computer.

As already indicated, it is industry practice for computer data loop terminals to be connected in a series loop arrangement, in a more or less random manner, dependent on the physical locations of terminals and the length of the "run" of wire or cable serving them. Under this practice, data loop wiring tends to proliferate and section lengths between data terminals tend to lengthen as time passes by. These tendencies develop as data terminals are added, moved or taken out of service.

Data loop wiring patterns are as numerous as the existing physical terminal loops multiplied by the number of people engaged in implementing these provisions. No particular pattern exists or is readily evident. Consequently, each installation of data loop wiring develops in a somewhat different pattern, and changes significantly with time because of the moves, additions, and disconnections of data terminals assigned to that loop. As a result, these wiring patterns become complex and time consuming to even those technicians who have worked on them before. They are even more so to the technicians who are called to work on them for the first time.

Efficient computer operation requires data terminals to be moved, added disconnected or "worked on" because of trouble either in a data terminal or in its serving wires. As indicated above the complexity of the wiring requires specially trained people to work on changes in the wiring pattern or on the clearing of trouble. Many times these men are not instantly available and operating inefficiencies continue until they arrive on the scene and finish the task they have been called on to perform. Many times an individual wire trouble serving a single data terminal will result in all data terminals on the same loop being out of service, if technical people are not available to analyze and correct such a situation, all data terminals on that loop are useless pending the arrival of the technician.

SUMMARY OF THE INVENTION

It is a primary object of this invention to provide a switching system for use with computer data loop terminals and a method of operating same.

It is a further object of this invention to provide a switching system of the above type where a multiple pole multiple throw switching means is provided for each subloop whereby rapid isolation thereof may be readily effected by non-technical personnel.

It is a further object of this invention to provide a method and apparatus for operating a switching system of the above type whereby a faulty subloop within a loop may be rapidly located.

It is a further object of this invention to provide a switching system of the above type wherein a plurality of loops may be combined into a single loop upon the occurrence of a fault within the central computer so that a second remote or local computer or controller can communicate with selected data terminals from each of the loops comprising the combined loop.

Further objects and advantages of the invention will become apparent from a reading of the following specification and claims taken with the drawing.

DESCRIPTION OF THE PREFERRED EMBODIMENTS OF THE INVENTION

Figure 2:
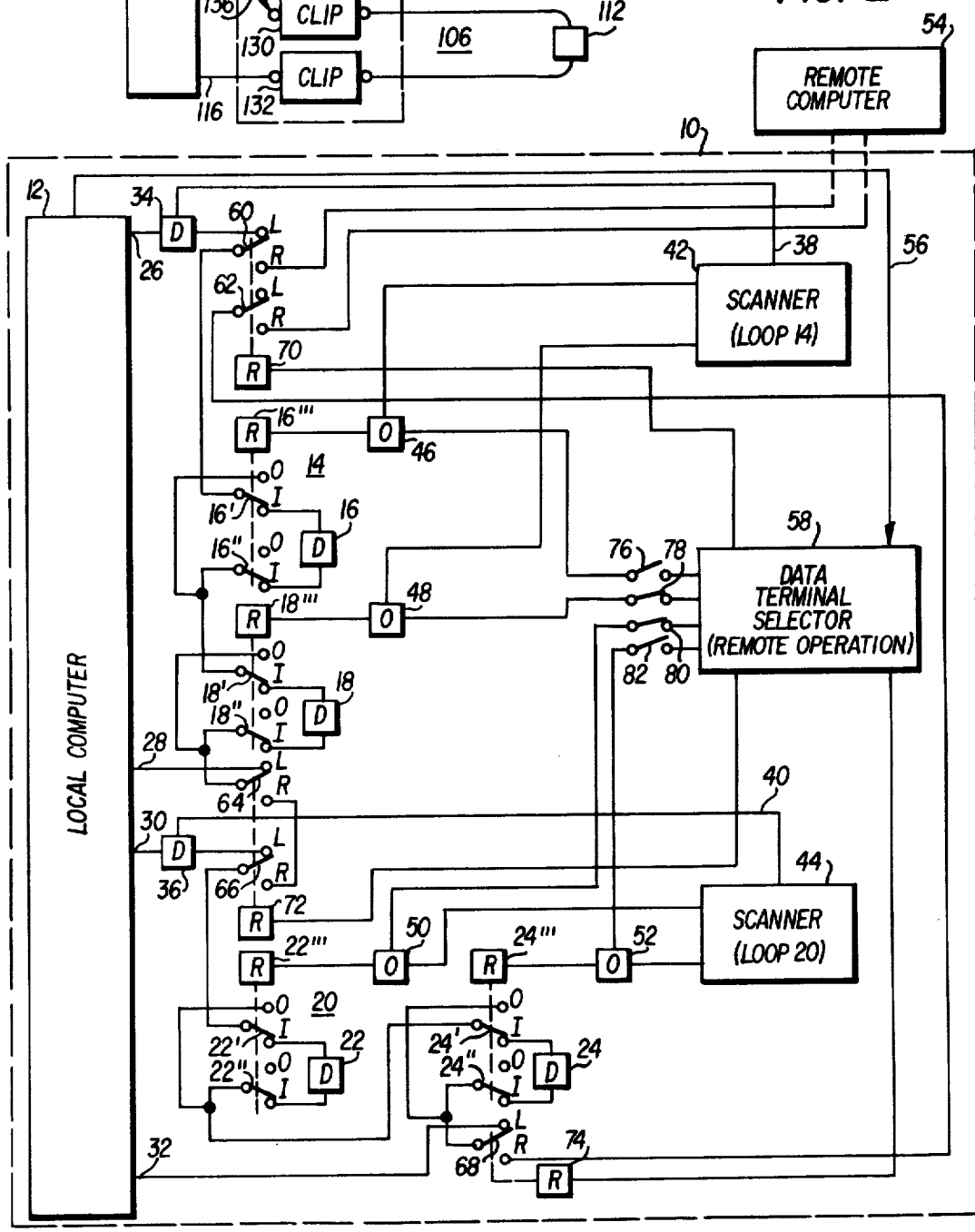
FIG. 2 is a combined schematic and block diagram of an illustrative switching system in accordance with the invention.

Referring to the drawing where like reference numerals refer to like parts, there is shown in FIG. 2 an overall illustrative system configuration of the invention disposed at location 10 under the control of a computer or controller 12. It should be understood that, although computer 12 is typically located at the site of the data terminals, it may be located at a remote location. Further, the computer 12 need not necessarily be a general purpose computer but may be any controller or computing device suitable for collecting the data produced at the data terminals. In the specification and claims, the terms computer, controller, and computing device will be used interchangeably. Also the computer 12 need not be connected directly to the data terminals but may also be indirectly connected through appropriate connecting circuitry such as a modem.

A first data loop generally indicated at 14 includes data terminals 16 and 18 where these terminals are typically located a long distance from the local controller. It should be understood that the number of terminals on loop 14 would typically be much greater than two; the latter number having been chosen for ease of illustrating certain features of the invention. A second data loop generally indicated at 20 includes data terminals 22 and 24. Loops 14 and 20 are substantially the same in construction and operation, as is known, and thus, the comments made hereinafter with respect to the operation of loop 14 will also apply to loop 20. Further loops may be connected to controller 12 and usually three loops of data terminals are so connected. Generally, a typical controller and typical data terminals are described in further detail in the aforementioned IBM publication.

A pair of switching means 16' and 16" are respectively connected in the input line to and output line from data terminal 16. As will be brought out in more detail hereinafter, in FIG. 3, the input and output lines to a data terminal may each comprise a pair of lines; however, each pair is shown only as a single line in FIG. 2 for ease of illustration. Switches 16' and 16" are preferably located near the controller. The switches are shown as double pole, double throw type where each switch has a pair of contacts O and I where O is the contact position to which the switches are thrown when data terminal 16 is removed from loop 14 while I is the contact position (shown in FIG. 2), to which the switches are thrown when the data terminal is in the loop. The above also applies for switches 18' and 18" associated with terminal 18; switches 22' and 22" associated with terminal 22 and switches 24' and 24" associated with terminal 24 as do all other statements made hereinafter regarding switching means 16' and 16".

Switches 16' and 16" are ganged together and may comprise either manual or automatic switches. For example the switches may be under relay control such as by relay 16'''.

Data loop 14 is connected to controller 12 at output point 26 and input point 28 while loop 20 is connected at points 30 and 32. Detectors 34 and 36 may be respectively provided in loops 14 and 20. These detectors determine whether a data signal is present in the loop and if a signal is not present (thereby indicating a fault in the loop), an alarm signal is sent over either line 38 or 40 (depending on which loop the fault is in) to initiate either a scanner 42 or a scanner 44. Scanner 42 is connected to relays 16''' and 18''' via OR gates 46 and 48 while scanner 44 is connected to relays 22''' and 24''' via OR gates 50 and 52. As will be brought out in more detail hereinafter, the scanners, when actuated, sequentially energize their associated relays to provide automatic location and switching out of a data terminal and its associated input and output wires whenever the loop fault is associated with that terminal. When the fault has been located, normal loop operation is restored. The scanners 42 and 44 and their associated detectors 34 and 36 are optional and the switches (16', 16"); (18', 18"); (22', 22") and (24', 24") may be manually sequentially operated and still substantially reduce the amount of time needed to isolate the fault thereby reducing wasteful data loop down-time. Further, the controller may be of the type which automatically provides an alarm signal identifying which loop has the fault — that is, the detecting means is included within the controller. Also scanning of the switches need not be sequential but can be in any predetermined order.

Whenever the controller itself becomes inoperational due to an internal fault, it is necessary to have a backup controller 54 which typically is disposed at a location remote from that of controller 12 but not necessarily so. As is known, the remote controller may be automatically notified by an appropriate alarm signal and this same signal may be applied over line 56 to a terminal selector 58. As will be described in more detail hereinafter, selector 58 with its associated circuitry disconnects loops 14 and 20 from controller 12, combines loops 14 and 20 into a single loop which is connected to remote controller 54, and then incorporates certain ones of the data terminals 16 – 24 into the combined loop. This is all done simultaneously. It is typically necessary to eliminate certain ones of the data terminals from the combined loop since there is a limit to the number of data terminals that can be supported by a loop.

The circuitry associated with selector 58 includes switching means 60 – 64 in loop 14 and switching means 66 and 68 in loop 20. Each of these switches has L (local) and R (remote) contacts and may be of the same type as switches 16 – 24 where switches 60 and 62 may be controlled by a relay 70; switches 64 and 66 by a relay 72; and switch 68 by a relay 74. Whenever the data terminal selector is actuated either manually or by an alarm signal over line 56, relays 70 – 74 are energized to switch switches 60 – 68 from their L to R contacts whereby loops 14 and 20 are combined into a single loop under the control of remote controller 54, as will be described in more detail hereinafter. Since the total number of data terminals 16 – 24 may be more than can be incorporated into a single loop, it may be necessary to remove from the loop the less important terminals. In order to remove predetermined ones of the terminals from the combined loop, data terminal selector 58 is connected to relays 16′′′, 18′′′, 22′′′ and 24′′′ through OR gates 46 – 52 via switches 76 – 82. When switches 78 and 80 are closed as shown in FIG. 2, data terminals 18 and 22 will be removed from th combined loop due to the energization of relays 18′′′ and 22′′′ by data terminal selector 58, which, in turn, is actuated by the alarm signal on line 56. Manually opening lead 56 or removal of the alarm signal returns the system to its status prior to the occurrence of the internal fault in controller 12 — that is loops 14 and 20 are individually connected to controller 12 with each loop having the removed data terminals restored thereto. As can be appreciated, the output signals from selector 58 are merely of the ON-OFF type depending on the presence of an alarm signal or other energizing source on line 56 and thus further details thereof are not shown since they per se are not part of the invention. The switches 76 – 82 are typically manually set beforehand depending on which data terminals are thought to be the least important whenever failure of local controller 12 occurs. It should be understood that data terminal selector 58 and its associated switches 76 – 82 and relays 70 – 74 are optional and that the switches 60 – 68 may be operated manually upon occurrence of the alarm signal which may be audible or other indication of controller failure.

Figure 3:
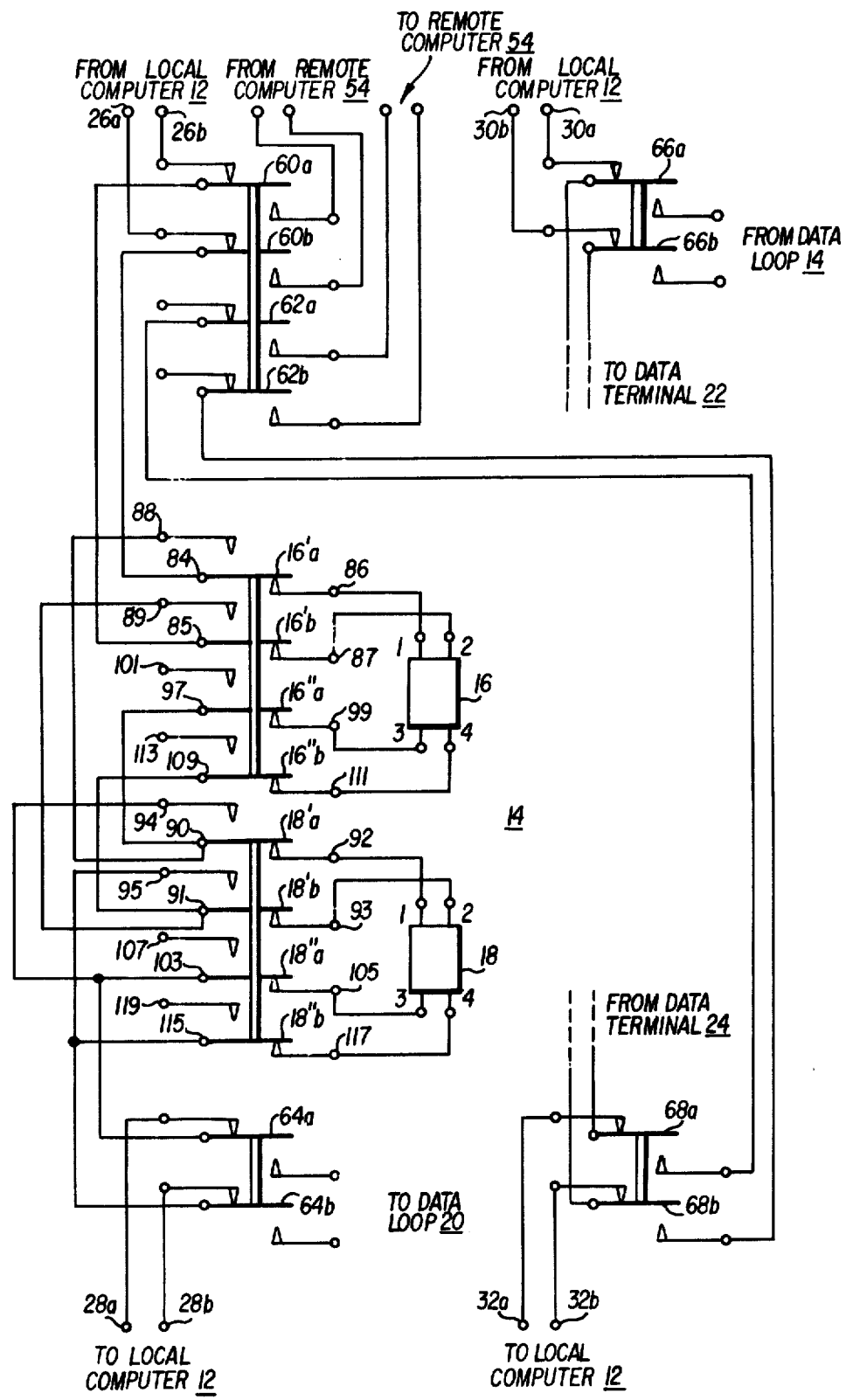
FIG. 3 is a schematic diagram of a two-wire system corresponding to FIG. 2.

Referring now to FIG. 3, there are shown loops corresponding to loops 14 an 20 of FIG. 2 where each loop comprises a pair of wires rather than the single wire representation of FIG. 2. For sake of simplicity a number of the components of FIG. 2 are not shown in FIG. 3. Switch 16′ of FIG. 2 corresponds to switches 16′a and 16′b of FIG. 3, similar reference numerals being used for the remaining switches and connections of FIG. 3. As can be appreciated from FIG. 3, two pole double throw and four pole double throw switches are shown; however relays, diodes and other electronic switches could also be used to implement the two pole or four pole, double throw switching functions. Further, if a single wire system (rather than a pair of wires) is employed, two pole, double throw switches such as shown in FIG. 2 would be used and would be functionally equivalent to the four pole, double throw switches of FIG. 3. In general, the number of poles employed by a switching means varies with the number of input and output wires to a data terminal, the use of "common" circuit wiring leads, the use of solid state switching means or other similar wiring variations used to accomplish the features of this system.

Thus, in general, there is disclosed in FIG. 3 a switching system for use with a plurality of data terminals 16 and 18 connected in series in a loop, the ends of which are connected to a central controller so that the central controller may communicate with the data terminals where the loop includes a pair of wires for communicating data to and from the terminals. The system comprises a plurality of four pole, double throw switching means where each pole includes an input terminal, a first output terminal and a second output terminal. The loop is arranged in a plurality of subloops respectively corresponding to the plurality of data terminals, where the data terminals are respectively disposed at the ends of the subloops remote from the central controller and the other ends of the subloops are disposed at a single location, preferably near the central controller.

The plurality of switching means are disposed at the single location and are respectively associated with the plurality of subloops so that the input terminal (for example, terminal 90) for the first pole of each switching means is connected to the input terminal (for example, terminal 97) for the third pole of the prior switching means except the input terminal 84 for the first pole of the first switching means on the loop is connected after passing through switching means 60b to a first wire of the pair of wires from the central controller. The first output terminal 86, 92 for the first pole of each switching means is connected to the first of the pair of wires to the data terminal associated with the switching means. The second output terminal (for example, terminal 88) of the first pole of each switching means is connected to the input terminal 90 for the first pole of the following switching means except the second output terminal 94 for the first pole of the last switching means on the loop is connected to the first wire of the pair of wires to the central controller.

The input terminal (for example, terminal 91) for the second pole of each switching means is connected to the input terminal (for example, terminal 109) for the fourth pole of the prior switching means except the input terminal 85 for the second pole of the first switching means on the loop is connected after passing through switching means 60a to the second wire of the pair of wires from the central controller. The first output terminal (87, 93) for the second pole of each switching means is connected to the second of the pair of wires to the data terminal associated with the switching means. The second output terminal (for example, terminal 89) of the second pole of each switching means is connected to the input terminal (for example, terminal 91) for the second pole of the following switching means except the second output terminal 95 for the second pole of the last switching means on the loop is connected to the second wire of the pair of wires to the central controller after passing through switching means 64b.

The input terminal (for example, terminal 97) for the third pole of each switching means is connected to the input terminal (for example, terminal 90) for the first pole of the following switching means except the input terminal 103 for the third pole of the last switching means on the loop is connected to a first wire of the pair of wires to the central controller after passing through switching means 64a. The first output terminal 99, 105 for the third pole of each switching means is connected to a first of the pair of wires from the data terminal associated with the switching means. The input terminal, (for example, terminal 109) for the fourth pole of each switching means is connected to the input terminal (for example, terminal 91) for the second pole of the following switching means except the input terminal 115 for the fourth pole of the last switching means on the loop is connected to the second wire of the pair of wires to the central controller through switching means 64b. The first output terminal 111, 117 for the fourth pole of each switching means is connected to the second of the pair of wires from the data terminal associated with the switching mens.

Figure 1:
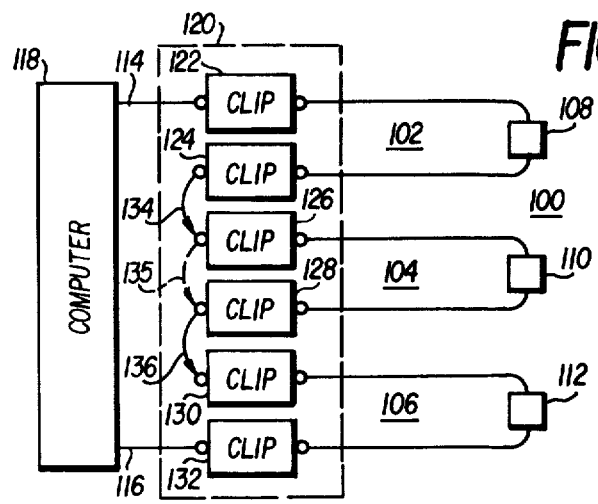
FIG. 1 is a combined schematic and block diagram illustrating a prior art arrangement for use with computer data loop terminals.

Thus, whenever one of the plurality of switching means is positioned to connect the input terminal of each pole to the first output terminal thereof, the data terminal associated with the one switching means is connected in circuit in the loop while whenever the one switching means is switched to connect the input terminal of each pole to the second output terminal thereof, the last-mentioned data terminal and its associated input and output wires are immediately switched completely out of the loop while substantially simultaneously the open circuit introduced in the loop by removing the data terminal and its associated wire is shorted. Hence, the above arrangement is particularly effective when compared to that of FIG. 1 where the clips and jumper cables must be handled manually. In particular, the arrangement of FIGS. 2 and 3 can be readily operated by non-technical personnel not only to remove a subloop from the loop but also to locate a faulty subloop.

In operation system down-time is substantially lessened because the invention makes it possible to:

1. Operationally connect any data terminal (for example, terminal 16) to the regular data loop 14, to which it is assigned, by placing its associated switches 16' and 16" in an "IN SERVICE" position (I contact). By this simple means, any, or all, or none of the data terminals assigned to a loop can be connected into it. No interruption of the data gathering function of the data loop takes place. When switches 16' and 16" are connected to their I contacts the data stream from controller 12 flows in FIG. 2 from point 26 to point 28 via detector 34, switch 60 (which is in its L position), switch 16', data terminal 16, switch 16", switch 18', data terminal 18, switch 18" and switch 64 (which also is in its L position).

2. Operate any or all of switches 16–24 to their "OUT OF SERVICE" position (O contact) and so remove any or all of data terminals from their assigned regular data loop. Terminals can be taken out of service when they are not required and for day to day business. Removal of terminals automatically and simultaneously rewires the data loop so that all IN SERVICE terminals operate normally with no interruption to computer loop operation. When switches 16' and 16" are connected to their O contacts the data stream from controller 12 flows in FIG. 2 from point 26 to point 28 via detector 34, switch 60, switch 16', switch 18', data terminal 18, switch 18" and switch 64.

3. Remove a defective data terminal, or one that has trouble on its serving wires, by operating its associated switching devices to the "OUT OF SERVICE" position (O contact). As explained in (2) above, the removal of a terminal rewires the data loop so that all IN SERVICE terminals work normally. This action also automatically isolates the defective data terminal and its serving wires making it much easier to analyze and locate the difficulty causing the service failure.

4. Quickly identify the trouble location that renders all data on one loop out of service. For example, a wiring trouble on a serving wire to any data terminal generally causes all other terminals on the same loop to be out of service as well. This system arrangement locates such a difficulty by merely operating each switching device in turn to its OUT OF SERVICE position. When the terminal with the wiring trouble is reached, the data loop will immediately begin functioning normally and correctly, and, of course, so will all the other terminals on the loop. For example, if output wire from data terminal 18 is defective, data flow through all of loop 14 will be interrupted. This down-time can be extremely expensive inasmuch as the data accumulated at all terminals on the loop must subsequently be manually entered into controller 12 when the operation of the loop is restored. In order to quickly locate defective terminal 18, switches 16' and 16" are switched to their OUT OF SERVICE (O contact) positions thereby removing data terminal 16 and its associated input and output (service) wires from the loop. Since the trouble is not connected with terminal 16, the loop will remain inoperative. Switches 16' and 16" may then be switched back to their I contacts and switches 18' and 18" to their O contacts. The latter action removes the fault from the loop whereby data immediately begins to flow again therein thereby substantially reducing the down-time of terminal 16. It should be appreciated that the foregoing sequential removing and replacing of terminals is particularly effective when a large number of terminals are on a loop, which is usually the case.

The foregoing function is automatically performed by detector 34 and scanner 42 where detector 34, upon sensing the absence of the data flow, generates an alarm signal on line 38 which actuates scanner 42, which initially is set to energize relay 16''' and thus temporarily remove terminal 16 from the loop. The alarm signal on line 38 will continue since data flow to the loop will not be restored. The scanner then moves to relay 18''' for the energization thereof to effect the removal of terminal 18 and the re-connection of terminal 16 into the loop. Since the fault is connected with terminal 18, data will again flow in the loop, which is sensed by detector 34 to remove the alarm signal from scanner 42 and thus inhibit further scanning of the terminals. The scanner may be provided with a plurality of lights (not shown) respectively corresponding to the plurality of data terminals whereby the light associated with the defective terminal will be lit to effect identification thereof. Upon removal of the alarm signal, the scanner may be returned to its first position or left at the position at which it was inhibited, assuming, in the latter case, it will return to its first position after it has scanned its last position. Thus, any scanner may be used which sequentially scans all of its positions regardless of its starting position until it is inhibited from further operation. With respect to detector 34, any detector may be used which generates an alarm signal which exceeds a predetermined threshold whenever at binary data signal (2400 or 4800 bps, for example) or the like is present and vice versa when the signal is not present. The alarm signal may then be inverted and applied to over line 38 where the scanner 42 would be responsive to any signal which exceeds the threshold to commence its operation. Further details of the scanner and detector are not described since as such they are not part of the invention.

5. Reconfigure selected data terminals from all associated regular data loops to an emergency non-associated data loop. This operating procedure is necessary when "computer machine failure" (for example, failure of computer or controller 12) occurs. At such a time, switching devices 60–68 at a central site or sites are operated to their R positions (EMERGENCY) from their L positions (NORMAL OPERATING POSITIONS). Additionally, at the central site or sites, certain more important data terminals are specifically identified on each of the regular data loops so that their associated switching devices can be operated to an IN SERVICE position during such an emergency. Since the emergency loop usually can only handle a limited number of data terminals, those less important to the data collection objective of the computer system should have their switching device operated to OUT OF SERVICE positions.

Thus, assuming there are 120 data terminals on three separate "regular" data loops and it is desired to reconfigure 45 of these, some from each loop, to an "emergency" loop, by operating six "Regular-Emergency" switching devices 60–68 or only one (if they are all tied together) and operating 120 — 45 or 75 (or again only one if they are all tied together) associated switching devices to their OUT OF SERVICE position, the prevously designated 45 important terminals remain working on the emergency loop.

There is further flexibility inherent to this system such that it would lend itself to a backup on backup, etc. For example Location C (controller 54) could be a backup to A (controller 12). Location C could also be a backup to B (not shown) assuming both A and B did not require backup at the same time. Another Location D (not shown) could be used in addition to C if both A and B needed backup at the same time. Or Location C could take both A and B if they both needed backup, provided the important terminals were pre-designated at A and B.

The foregoing features of the system that contribute substantially to less "data terminal down-time" can be implemented by those whose daily job involves input to the data terminal, saving the time (down-time) involved in bringing technical specialists to the scene to accomplish by wiring changes those things that this system down quickly and effectively by its easily understood and easily operated switching devices.

Other operating features of the system that facilitate effective data collection and which also tend to minimize down-time are an ability to:

1. Readily provide a means to measure the electrical resistance of each section of the data loop so as to keep track of the respective section measurements. This is important, because between any two terminals there is a resistance limit that should not be exceeded, to insure against garbled or no input to the central computer. With this system, the operation of a switching device to take a data terminal out of service, also automatically takes out the resistance of the serving wires and isolates these wires and the data terminal connected to them.

If a loop run is too long, the computer central control senses "an open" condition, and because the data loop resistance between working terminals is too high, "loop start up" cannot be accomplished. For example, if only one data terminal of many on the same loop seeks to start operation, and all other terminals are shut down, and all wires serving them are electrically part of the series data loop, the computer central control will "sense an open" and prevent operation of single "early bird" data terminal — that is, one that attempts to come on line before other terminals are actuated.

Industry practice has in some instances kept a few selected data terminals continuously running to make single terminal start up possible. Under the system of the subject application, it is only necessary to operate the out of service switching devices on all but the one early bird terminal to get this terminal on line if the number of shut down terminals makes the loop resistance too great to do so. When the early bird terminal is on line then the out of service switches previously operated can be restored to their in service position. Under the provisions of this system, data loop resistance can be controlled so as to meet "operating loop resistance limits" by the control available through the "associated switching devices." Individual situations are easily measurable, predictable and controllable.

2. Direct technically trained trouble shooters to a specifically located "trouble section" of a data loop that is experiencing trouble. A trouble section is a data terminal and its serving wires or subloop. When a data terminal has its associated switching device operated to the Out of Service position both the serving wires and the terminal are isolated from the rest of the data loop and the terminals working on it. this enables technicians to clear troubles without interference to the data collection process.

3. Physically move, add or disconnect data terminals without interference to other data terminals on the same regular data loop. Such work can be accomplished during hours when the data loop in in operation. Because of the isolation feature elaborated upon above, all work necessary can be done with the associated switching devices in the out of service position. When all work is completed and tested, the "moved" or "added" terminals can go on line by operating their respective switching devices from their out of service position to their in service position.

4. Building into this system a provision for added future operating features. This provision is inherent because of the system plan for central site termination of individual data terminals together with their associated switching devices. This arrangement allows other desired operation features to be obtained with different switching arrangements and/or wiring between control sites.

5. Have a built-in provision, if such is required, so that it is possible to sequentially present data terminals for "day by day" address of the computer network for instruction or to give "close out" information to the computer network. The number of data terminals on a data loop is governed by the "bit stream" speed of the data line and is proportional to the individual "bit requirements" of a terminal. Various means may be used to fit all the terminals on a loop into their proper time slot and difficulties may occur particularly in the early stages of a computer installation. Consequently, when a number of data terminals simultaneously seek to "address the network" or "leave the network," assigned time slots in the bit stream do not line up with terminals and computer machine stoppages occur, occasioning considerable operating confusion and inefficiency. When a condition such as described occurs, the invention of the subject application permits a readily instituted sequential addressing and closing out procedure that prevents computer machine problems as described and limits resultant operating inefficiencies. The procedure can be continued and/or modified until all such difficulties have been eliminated.

What is claimed is:

1. A switching system for use with a plurality of data terminals connected in series in a loop, the ends of which are connected to a first computer or the like so that said first computer communicates with said data terminals, said system comprising a plurality of switching means each having at least an input terminal, a first output terminal and a second output terminal;

said loop being arranged in a plurality of subloops respectively corresponding to said plurality of data terminals where the data terminals are respectively disposed at the ends of said subloops remote from said first computer and the other ends of said subloops are disposed at a single location and where each subloop includes at least one input wire extending from said single location to the input of the data terminal associated with the subloop and at least one output wire extending from the output of said associated data terminal to said single location;

means for operating each said switching means from a first position to a second position or vice versa;

said plurality of switching means being disposed at said single location and associated with said plurality of subloops so that for each subloop there is a first and second of said switching means where the first switching means is associated with the input wire for the subloop and the second switching means is associated with the output wire for the subloop so that in response to each switching means being in its said first position, the input terminals thereof are respectively connected to their associated first output terminals and in response to each switchimg means being in its said second position the said last-mentioned input terminals are respectively connected to their associated second output terminals;

the first output terminal of each first switching means being connected to the input wire of its associated subloop and the first output terminal of each second switching means being connected to the output wire of its associated subloop so that the data terminal of the subloop is connected into said loop in response to its associated switching means being in its said first position;

the input terminal of each first switching means being connected to the input terminal of the second switching means associated with the subloop immediately prior to the subloop containing said last mentioned first switching means to complete the connection from subloop to thereby form said loop;

a shorting wire connected from the second output terminal of each first switching means to the input terminal of each second switching means so that any data terminal and its associated input and output wires may be simultaneously removed completely from said loop by operating its associated switchimg means to its said second position while substantially at the same time the open circuit introduced in the loop by the removal of the data terminal and its associated input and output wires is shorted out.

2. A switching system as in claim 1 where said single location is adjacent said first computer.

3. A switching system as in claim 1 where a plurality of said loops are connected to said first computer, said system including a second computer and a plurality of further switching means respectively associated with said plurality of loops for combining said plurality of loops into a combined single loop and for connecting said combined single loop to said second computer whereby upon occurence of an internal fault within the first computer, said further switching means are operated to connect said single combined loop to said second computer and predetermined ones of said switching means associated with the subloops are operated to insert preselected ones of said data terminals into said single combined loop.

4. A switching system as in claim 3 where said first computer generates a first alarm signal upon the occurrence of a fault internal thereto, said system including means responsive to said first alarm signal for automatically operating said further switching means so that said plurality of loops are combined into said single combined loop and connected to said second computer.

5. A switching system as in claim 1 where a plurality of said loops are connected to said first computer, said system including a second computer and a plurality of further switching means respectively associated with said plurality of loops so that two of said further switching means are connected into each loop, one at the beginning of the loop and the other at the end thereof, said further switching means having respective first positions at which said plurality of loops are connected to said first computer and respective second positions at which said plurality of loops are combined into a combined single loop and are connected to said second computer.

whereby upon occurrence of an internal fault within the first computer, said further switching means are operated to their respective second positions to connect said single combined loop to said second computer and predetermined ones of said switching means associated with the subloops are operated to insert preselected ones of said data terminals into said single combined loop.

6. A system as in claim 1 including detecting means for generating an alarm signal when a fault occurs on one of the subloops of said loop and scanning means responsive to said alarm signal for operating said switching means in a predetermined order to their second positions until said one subloop is removed from the loop at which time said detecting means ceases to generate said alarm signal and thereby stop said scanning means to thus automatically locate said one subloop upon which said fault occurs.

7. A system as in claim 6 where said scanning means operates said switching means in sequential order.

8. A system as in claim 6 where said scanning means includes means for returning each operated switching means to its first positions if the operation of the switching means does not cause said detecting means to cease generating said second alarm signal.

9. A system as in claim 6 where said detecting means is connected in said loop.

10. A system as in claim 6 where said detecting means is included within said first computer.

11. A system as in claim 1 where said switching means is a multiple pole, multiple throw switch.

12. A switching system for use with a plurality of data terminals connected in series in a loop, the ends of which are connected to a first computer or the like so that said first computer communicates with said data terminals, said system comprising a plurality of double throw switching means each having at least a first pole and a second pole;

said loop being arranged in a plurality of subloops respectively corresponding to said plurality of data terminals where the data terminals are respectively disposed at the ends of said subloops remote from said first computer and the other ends of said subloops are disposed at a single location and where each subloop includes at least one input wire extending from said single location to the input of the data terminal associated with the subloop and at least one output wire extending from the output of said associated data terminal to said single location;

means for operating each said switching means from a first position to a second position or vice versa;

said plurality of switching means being disposed at said single location and respectively associated with said plurality of subloops so that for each subloop, the first pole of the switching means associated with the subloop is associated with the input wire for the subloop and the second pole thereof is associated with the output wire for the subloop and where each pole has an input terminal, a first output terminal and a second output terminal so that in response to each switching means being in its said first position, the input terminals for the first and second poles thereof are respectively connected to their associated first output terminals and in response to the switching means being in its said second position the said last-mentioned input terminals are respectively connected to their associated second output terminals, the first output terminal of each first pole being connected to the input wire of its associated subloop and the first output terminal of each second pole being connected to the output wire of its associated subloop so that the data terminal of the subloop is connected into said loop in response to its associated switching means being in its said first position;

the input terminal of each first pole being connected to the input terminal of the second pole of the switching means associated with the subloop immediately prior to the subloop containing said last mentioned first pole to complete the connection from subloop to subloop to thereby form said loop;

a shorting wire connected from the second output terminal of each first pole to the input terminal of each second pole so that any data terminal and its associated input and output wires may be simultaneously removed completely from said loop by operating its associated switching means to its said second position while substantially at the same time the open circuit introduced in the loop by the removal of the data terminal and its associated input and output wires is shorted out.

13. A method of operating a switching system for use with a plurality of data terminals connected in series in a loop, the ends of which are connected to a first computer or the like so that said first computer communicates with said data terminals, said system comprising a plurality of switching means each having at least an input terminal, a first output terminal and a second output terminal; said loop being arranged in a plurality of subloops respectively corresponding to said plurality of data terminals where the data terminals are respectively disposed at the ends of said subloops remote from said first computer and the other ends of said subloops are disposed at a single location and where each subloop includes at least one input wire extending from said single location to the input of the data terminal associated with the subloop and at least one output wire extending from the output of said associated data terminal to said single location; means for operating each said switching means from a first position to a second position or vice versa; said plurality of switching means being disposed at said single location and associated with said plurality of subloops so that for each subloop there is a first and second of said switching means where the first switching means is associated with the input wire for the subloop and the second switching means is associated with the output wire for the subloop so that in response to each switching means being in its said first position, the input terminals thereof are respectively connected to their associated first output terminals and in response to each switching means being in its said second position the said last-mentioned input terminals are respectively connected to their associated second output terminals; the first output terminal of each first switching means being connected to the input wire of its associated subloop and the first output terminal of each second switching means being connected to the output wire of its associated subloop so that the data terminal of the subloop is connected into said loop in response to its associated switching means being in its said first position; the input terminal of each first switching means being connected to the input terminal of the second switching means associated with the subloop immediately prior to the subloop containing said last mentioned first switching means to complete the connection from subloop to subloop to thereby form said loop; a shorting wire connected from the second output terminal of each first switching means to the input terminal of each second switching means so that any data terminal and its associated input and output wires may be simultaneously removed completely from said loop by operating its associated swtiching means to its said second position while substantially at the same time the open circuit introduced in the loop by the removal of the data terminal and its associated input and output wires is shorted out, said method comprising the steps of
- indicating the occurrence of a fault on said loop which prevents communication of said first computer with said data terminals;
- locating which subloop said fault has occurred upon by operating preselected ones of said switching means to their second positions until said last mentioned communication is restored whereby the faulty subloop is removed from the loop; and
- returning the operated switching means to their first positions except the ones associated with the faulty subloop.

14. A method as in claim 13 where said switching means are operated in sequential order.

15. A method as in claim 13 where all the switching means are operated to their second positions without returning them to their first positions until the faulty loop is located, at which time all of the operated switching means are returned to their first positions except the one associated with the faulty subloop.

16. A method as in claim 13 where each switching means is operated to its second position to determine if its associated subloop is faulty and returned to its first position if the subloop is not faulty prior to operating the next switching means to its second position.

17. A switching system for use with a plurality of data terminals connected in series in a loop, the ends of which are connected to a computer so that said computer communicates with said data terminals where said loop includes a pair of wires for communicating data to and from the terminals, said system comprising
- a plurality of four pole, double throw switching means where each pole includes an input terminal, a first output terminal and a second output terminal;
- said loop being arranged in a plurality of subloops respectively corresponding to said plurality of data terminals, where the data terminals are respectively disposed at the ends of said subloops remote from said computer and the other ends of said subloops are disposed at a single location;
- a plurality of switching means being disposed at said single location and respectively associated with said plurality of subloops so that
- the input terminal for the first pole of each switching means being connected to the input terminal for the third pole of the prior switching means except the input terminal for the first pole of the first switching means on the loop is connected to a first wire of said pair of wires from said computer;
- the first output terminal for said first pole of each switching means being connected to said first of said pair of wires to the data terminal associated with the switching means;
- the second output terminal of said first pole of each switching means being connected to the input terminal for the first pole of the following switching means except the second output terminal for the first pole of the last switching means on the loop is connected to said first wire of said pair of wires to said computer;
- the input terminals for the second pole of each switching means being connected to the input terminal for the fourth pole of the prior switching means except the input terminal for the second pole of the first switching means on the loop is connected to the second wire of said pair of wires from said computer;
- the first output terminal for said second pole of each switching means being connected to said second of said pair of wires to the data terminal associated with the switching means;
- the second output terminal of said second pole of each switching means being connected to the input terminal for the second pole of the following switching means except the second output terminal for the second pole of the last switching means on the loop is connected to said second wire of said pair of wires to said computer;
- the input terminal for the third pole of each switching means being connected to the input terminal for the first pole of the following switching means except the input terminal for the third pole of the last switching means on the loop is connected to the first wire of said pair of wires to said computer;
- the first output terminal for said third pole of each switching means being connected to a first of said pair of wires from the data terminal associated with the switching means;
- the input terminal for the fourth pole of each switching means being connected to the input terminal for the second pole of the following switching means except the input terminal for the fourth pole of the last switching means on the loop is connected to the second wire of said pair of wires to said computer;
- the first output terminal for said fourth pole of each switching means being connected to the second of said pair of wires from the data terminal associated with the switching means; and
- means for switching each said switching means to thereby connect the input terminal of each pole to (a) its first output terminal when the switching means is in a first position and (b) to the second output terminal when in a second position so that whenever one of said plurality of switching means is positioned in its first position, the data terminal associated with said one switching means is connected in circuit in said loop while whenever said one switching means is switched to its second position, said last-mentioned data terminal and its associated input and output wires are immediately switched completely out of said loop while substantially simultaneously the open circuit introduced in the loop by removing the data terminal and its associated wire is shorted.

* * * * *